US005913189A

United States Patent [19]

Lee et al.

[11] Patent Number: 5,913,189

[45] Date of Patent: Jun. 15, 1999

[54] VOICE COMPRESSION SYSTEM HAVING ROBUST IN-BAND TONE SIGNALING AND RELATED METHOD

[75] Inventors: Ho Lee; Jeanne Hall, both of San Diego, Calif.; Dan Housam, Jefferson, Md.

[73] Assignee: Hughes Electronics Corporation, El Segundo, Calif.

[21] Appl. No.: 08/798,690

[22] Filed: Feb. 12, 1997

[51] Int. Cl.[6] .............................. G10L 3/00; H04L 15/00

[52] U.S. Cl. .......................... 704/226; 704/226; 379/283; 379/351

[58] Field of Search ............................... 379/88, 89, 282, 379/283, 351; 455/274; 704/266, 226, 220, 250; 370/524, 525, 526

[56] References Cited

U.S. PATENT DOCUMENTS

| | | | |
|---|---|---|---|
| 4,833,399 | 5/1989 | So | 324/79 |
| 4,862,492 | 8/1989 | Zwick | 379/386 |
| 4,990,848 | 2/1991 | So | 324/79 |
| 5,333,191 | 7/1994 | McCarthy | 379/89 X |
| 5,400,394 | 3/1995 | Raman et al. | 379/88 |
| 5,485,522 | 1/1996 | Solve et al. | 704/226 X |
| 5,642,397 | 6/1997 | Agbaje-Anozie | 370/313 |
| 5,699,421 | 12/1997 | Nirshberg et al. | 379/386 |
| 5,737,331 | 4/1998 | Hoppal et al. | 704/266 X |
| 5,745,523 | 4/1998 | Dent et al. | 455/74 X |

*Primary Examiner*—David R. Hudspeth
*Assistant Examiner*—Abul K. Azad
*Attorney, Agent, or Firm*—John T. Whelan; Michael W. Sales

[57] ABSTRACT

A communication system, and related method, for reliably transmitting DTMF code signals through a low-bit rate channel employing a VSELP speech compression algorithm. The system adds relatively low-level noise to the analog DTMF signals before encoding by the compression algorithm. By adding the low-level noise to the DTMF signals, the tones associated with the DTMF signals can be reliably detected on the receiving end.

15 Claims, 1 Drawing Sheet

VOICE COMPRESSION SYSTEM HAVING ROBUST IN-BAND TONE SIGNALING AND RELATED METHOD

BACKGROUND OF THE INVENTION

This invention relates to digital communication systems, and more particularly, to a communication system, and related method, that uses a voice compression algorithm for digitally compressing an audio signal.

Telephone providers are accustomed to perform audio channel testing through analog cellular channels using test software at a Mobile Telephone Office (MTSO). The tests cause a specially configured mobile subscriber unit, placed at each cell site, to loop back received audio signals, send test tones, perform channel quality measurements on the forward audio path, and transmit test results.

More recently, mobile cellular providers have provided digital cellular channels that transmit audio signals using digital coding techniques. A class of speech coding techniques provides high-quality synthesized speech at relatively low bit rates. An example of such a coding technique is the Vector-Sum Excited Linear Prediction (VSELP) compression algorithm, used in the North American Digital Cellular Standard, IS-54B. Voice compression algorithms such as these do not process single frequency tones accurately. This is due to short periods of filter instability when a tone is processed. Generally, a short period of filter instability does not greatly affect the quality of voice signals because voice signals have a constantly varying pitch. The filter instability effects are further tolerated because this class of voice compression algorithms allow transmission of quality voice signals at greatly reduced data rates.

SUMMARY OF THE INVENTION

The present invention is embodied in a communication system, and related method, that has improved tone detection performance for tones transmitted through a voice compression system. The performance improvement is obtained by adding a low level of noise to the tones before the tones are processed and encoded by the system's voice compression algorithm.

In one embodiment of the present invention, the communication system includes a tone generator that generates dual-tone multifrequency (DTMF) code signals and a noise generator that generates a noise signal. An adder sums the code signals and the noise signal to produce a combined signal. A voice compression and transmission system converts the combined signal into a low-bit rate digital signal, using a digital compression algorithm, and transmits the digital signal through a digital communication channel. A voice synthesizer receives the digital signal transmitted through the digital communications channel and converts the digital signal into an audio signal. A tone detector receives the synthesized audio signal and detects its associated DTMF code.

In a more detailed feature of the present invention, the audio-tone signals are dual-tone multifrequency (DTMF) codes associated with frequency pairs. Each frequency pair consists of one out of four frequencies from a low-frequency group and one out of four frequencies from a mutually exclusive high-frequency group. More specifically, the four frequencies in the low-frequency group are at about 697, 770, 852 and 941 hertz, respectively. The four frequencies in the high-frequency group are at about 1209, 1336, 1477 and 1633 hertz, respectively.

In another more detailed feature of the present invention, each tone signal has a power level between about 0 dBm and −25 dBm and the noise signal is gaussian or white noise having a power level of about −35 dBm over a 4 kilohertz band. Further, the digital compression algorithm is a prediction coding algorithm.

An alternative embodiment of the present invention resides in a method of stabilizing a digital communication channel that uses a speech compression algorithm for converting audio speech signal to digital form for transmission across the channel. An audio-tone signal having no more than two tones is combined or summed with an analog stabilization signal to generate a transmission signal. The stabilization signal has a power level and spectral content sufficient to stabilize the digital communication channel during compression and transmission of the transmission signal.

BRIEF DESCRIPTION OF THE DRAWINGS

The above and other aspects, features the advantages of present invention will be more apparent from the following more particular description thereof, presented in conjunction with the following drawing, wherein.

DETAILED DESCRIPTION OF THE INVENTION

Figure 1:
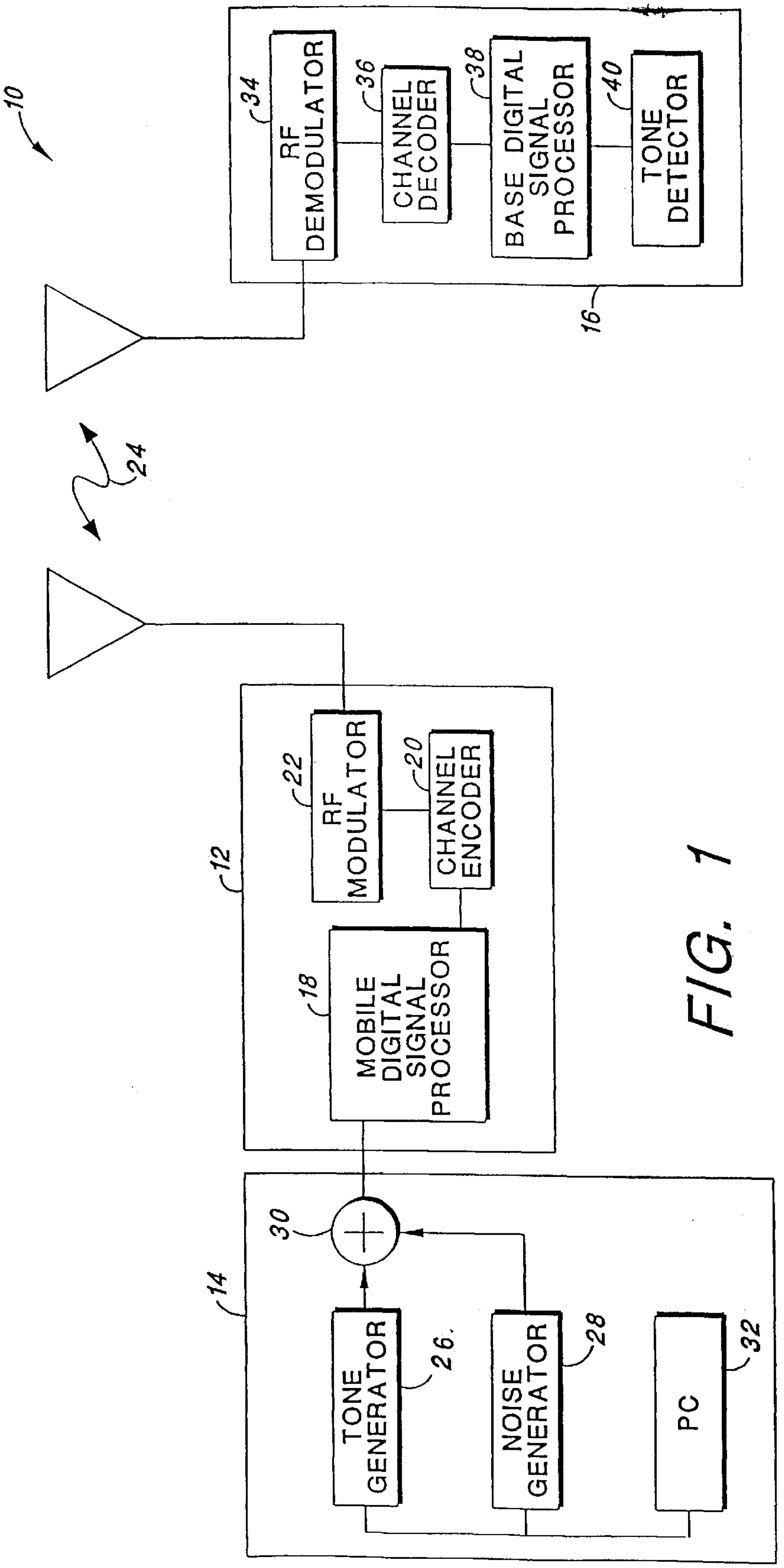
FIG. 1 is a block diagram of a voice communication system having a summer for adding low-level noise to a tone signal, before compression and transmission across a digital channel, in accordance with the present invention.

The following description is of the best mode presently contemplated for carrying out the invention. This description is not to be taken in a limiting sense, but is made merely for the purpose of describing the general principles of the invention. The scope of the invention should be determined with reference to the claims.

As shown in the exemplary drawings, and particularly in FIG. 1, the present invention is embodied voice compression system 10 that adds a relatively low level of white noise to audio-tone signals before the tone signals are encoded and transmitted through a digital communication channel 20. The low-level noise allows relatively robust tone detection after transmission by providing, at a relatively low power level that does not alter the detection of the tone signals, sufficient spectral information to stabilize digital filters used by the compression system.

The voice compression system 10 includes a base station 16, a mobile station 12, and a signal generator 14. The mobile station includes a digital signal processor 18, a channel encoder 20, and an rf modulator 22. The mobile station receives an audio signal from the signal generator 14 and transmits the audio signal to the base station 16 through an rf channel 24. More particularly, the mobile digital processor 18 digitizes the audio signal, compresses the signal, and sends the signal, using the channel encoder and the rf modulator, across the rf channel. The signal generator includes a tone generator 26, a noise generator 28, a summer 30, and a personal computer.

The tone generator 26 generates standard dual-tone multifrequency (DTMF) code signals. As shown in Table I below, each DTMF code signal consists of two tones.

TABLE 1

| DTMF Code Frequency Pairs | | | | |
|---|---|---|---|---|
| Frequency (Hz) | 1209 | 1336 | 1477 | 1633 |
| 697 | 1 | 2 | 3 | A |
| 770 | 4 | 5 | 6 | B |
| 852 | 7 | 8 | 9 | C |
| 941 | * | 0 | # | D |

Each tone has a predetermined frequency and power level between about +0 dBm and −25 dBm, with no more than 8 dB "twist" or difference between the power levels of the tones of the frequency pairs. More specifically, there are four higher frequency tones and four lower frequency tones, which provide 16 different tone or frequency pair combinations. Each tone pair represents a specific character or number (hereinafter merely referred to as a character). As shown in Table I, the 16 characters correspond to the characters on the keypad of a touch-tone telephone and are: 1–10, A–D, # and *.

The noise generator 28 generates a low-level white noise signal. The noise signal can be generated by a gaussian noise generator that is band limited to 4 kilohertz and that is set to a power level of −35 dBm.

The adder 30 sums the DTMF code signals received from the tone generator 26 and the noise signal received from the noise generator 28 and generates a combined analog signal.

The mobile digital signal processor 18 receives the combined analog signal from the adder 30, digitizes it, and digitally compresses it using a speech or voice compression algorithm. The digital signal processor 18 advantageously implements a Vector-Sum Excited Linear Prediction (VSELP) or similar compression algorithm. The VSELP algorithm is used in the North American Digital Cellular Standard, IS-54B. As mentioned before, the VSELP compression algorithm allows relatively short periods of filter instability. The unstable filter condition can, however, alter the frequency of a relatively pure tone signal passing through the communication system 10. The mobile station 12 transmits the compressed signal through the transmission medium 24, e.g., a cellular rf channel, to the base station 16.

The base station 16 includes an rf demodulator 34, a channel decoder 36, a base digital signal processor 38, and a tone detector 40. The base digital signal processor operates on the received compressed signal to decode the compressed signal and generate an analog signal based on the compressed signal. The decoded analog signal includes both the DTMF code signals and the noise signal. The noise signal generally does not interfere with the DTMF code signals because the signal power of the DTMF code signals is much greater (between approximately 0 dBm and −20 dBm) than the power of the noise signal (approximately −35 dBm).

The tone detector 40 receives the decoded analog signal from the base digital signal processor 38. The tone detector 40 determines the DTMF tones in the analog signal, if any, and decodes the characters associated with the DTMF tones in accordance with DTMF code signal detection standards known in the art.

Table 2, below, indicates the effectiveness of the present invention by presenting the results of a test performed by transmitting DTMF signals through the voice compression system 10. The DTMF digits were processed in the following sequence: 15948#26703*abod. The tones of the DTMF signals have an on time of 80 milliseconds and an off time of 60 milliseconds. Each tone has a signal power of −16 dBm except for the "twist" test (Table 5). The noise signal is provided by a 0 to 4 kilohertz band-limited gaussian noise generator set at a power level of −35 dBm.

In the test for the results shown in Table 2, the low-frequency tone was set to a frequency 1.5% above the specified frequency and the high-frequency tone was set to a frequency 1.5% below the specified frequency.

TABLE 2

| Detected Code | 1 | 5 | 9 | 4 | 8 | # | 2 | 6 | 7 | 0 | 3 | * | A | B | C | D |
|---|---|---|---|---|---|---|---|---|---|---|---|---|---|---|---|---|
| With No Noise | 1 | 1 | 1 | 1 | X | 1 | 1 | X | 1 | 1 | X | 1 | 1 | 1 | 1 | 1 |
| With Added Noise | 1 | 1 | 1 | 1 | 1 | 1 | 1 | 1 | 1 | 1 | 1 | 1 | 1 | 1 | 1 | 1 |

When the DTMF code signals were sequentially transmitted through the voice compression system 10 with no added noise, the tone detector 40 failed to detect the DTMF code signals for the characters "8," "6," and "3" as indicated by an X under the characters in the row labeled "With No Noise." In Table 2, a 1 [one] indicates successful character detection and an X indicates unsuccessful character detection. After the low-level noise was added, all of the characters in the sequence were successfully detected, as indicated by the ones in the row labeled "With Added Noise."

The present invention is advantageous for voice compression systems that use an in-band signaling method to transmit messages over a voice channel. For example, existing automated test tools for verifying channel quality use DTMF code signals to request that a remote site initiate a series of tests and reply. Reliable tone detection generally is not available on a voice channel using VSELP or similar compression and thus, the automated test tools for an analog system cannot be used. However, by adding the low-level noise before transmission, the tone can be reliability transmitted over a voice channel using digital compression without further modification to existing test equipment.

Adding the low-level noise provides sufficient signal bandwidth to stabilize the compression system's transfer function and permit reliable and robust tone signal transmission. Thus, DTMF code signals transmitted through a voice compression system of the present invention will meet the Bellcore standard specifications for DTMF signal frequency deviation and level deviation.

Note that the same technique may be used in other configurations. For example, a signal generator 14 may be coupled to the base station 16 and a tone detector 40 may be incorporated in the mobile station 12 for sending tones through the rf channel 24 from the mobile station to the base station.

While the invention herein disclosed has been described by means of specific embodiments and applications thereof, numerous modifications and variations could be made thereto by those skilled in the art without departing from the scope of the invention set forth in the claims.

What is claimed is:

1. A method of transmitting audio-tone signals through a digital communication channel, comprising:

providing not more than two audio-tone signals;

adding a noise signal to the audio-tone signals to produce a combined signal, the noise signal having power level, bandwidth and spectral content that stabilize the combined signal for digital filtering and digital compression;

digitizing and compressing the combined signal using a digital compression algorithm to produce a digital signal representing the combined signal;

transmitting the compressed digital signal through the digital communication channel;

receiving the compressed digital signal from the digital communication channel; and synthesizing an audio signal based on the received compressed digital signal received from the communication channel, the synthesized audio signal including the audio-tone signals.

2. A method of transmitting audio-tone signals as defined in claim 1, wherein the audio-tone signals are dual-tone multifrequency (DTMF) codes formed of frequency pairs, each pair consisting of one out of four frequencies from a low-frequency group and one out of four frequencies from a high-frequency group.

3. A method of transmitting audio-tone signals as defined in claim 2, further comprising:

decoding characters represented by the synthesized audio-tone signals, wherein the characters represented by the synthesized audio-tone signals are the same as the characters represented by the original audio-tone signals such that the characters are not altered by compression and transmission through the digital communication channel.

4. A method of transmitting audio-tone signals as defined in claim 2, wherein the noise signal is white noise having a power level of about −35 dBm.

5. A method of transmitting audio-tone signals as defined in claim 2, wherein:

the four frequencies in the low-frequency group are at about 697, 770, 852 and 941 hertz, respectively; and the four frequencies in the high-frequency group are at about 1209, 1336, 1477 and 1633 hertz, respectively.

6. A method of transmitting audio-tone signals as defined in claim 1, wherein the digital compression algorithm comprises a prediction coding algorithm.

7. The method of claim 1 wherein the noise signal is an RF signal having a bandwidth of at least about 4 kHz.

8. A communication system, comprising:

a tone generator that generates dual-tone multifrequency (DTMF) code signals;

a noise generator that generates a noise signal, the noise signal having power level, bandwidth and spectral content that stabilize the combined signal for digital filtering and digital compression;

an adder that sums the code signals and the noise signal to produce a combined signal;

a voice compression and transmission system that converts the combined signal into a low-bit rate digital signal, using a digital compression algorithm, and transmits the digital signal through a digital communication channel;

a voice synthesizer that receives the digital signal transmitted through the digital communications channel and converts the digital signal into an audio signal;

a tone detector that receives the synthesized audio signal and detects its associated DTMF code.

9. A communication system as defined in claim 8, wherein the DTMF codes are formed of frequency pairs, each pair consisting of one out of four frequencies from a low-frequency group and one out of four frequencies from a mutually exclusive high-frequency group.

10. A communication system as defined in claim 8, wherein:

the four frequencies in the low-frequency group are at about 697, 770, 852 and 941 hertz, respectively; and the four frequencies in the high-frequency group are at about 1209, 1336, 1477 and 1633 hertz, respectively.

11. A communication system as defined in claim 9, wherein the noise signal has a power level of about −35 dBm.

12. A communication system as defined in claim 8, wherein the digital compression algorithm comprises a vector-sum excited linear prediction (VSELP) algorithm.

13. The communication system of claim 8 wherein the noise signal is an RF signal having a bandwidth of at least about 4 kHz.

14. A method of stabilizing a digital communication channel that uses a speech compression algorithm for converting an audio speech signal to digital form for transmission across the channel comprising:

providing not more than two audio-tone signals;

providing an analog stabilization signal having a power level, bandwidth and spectral content sufficient to stabilize the signal for digital filtering and digital compression and having a power level sufficiently lower than the power level of the audio-tone signals to allow detection of the audio-tone signals;

summing the analog stabilization signal and the audio tone signals to generate a transmission signal;

compressing the transmission signal and transmitting it through the digital communication channel.

15. The method of claim 14 wherein the analog stabilization signal has a bandwidth of at least about 4 kHz.

* * * * *